US012326825B2

United States Patent
Kogelheide

(10) Patent No.: US 12,326,825 B2
(45) Date of Patent: Jun. 10, 2025

(54) PRIMARY COMMUNICATION APPARATUS, COUPLING MODULE AND COMMUNICATION SYSTEM

(71) Applicant: Phoenix Contact GmbH & Co. KG, Blomberg (DE)

(72) Inventor: Martin Kogelheide, Witten (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 100 days.

(21) Appl. No.: 18/198,183

(22) Filed: May 16, 2023

(65) Prior Publication Data
US 2023/0376439 A1    Nov. 23, 2023

(30) Foreign Application Priority Data
May 17, 2022   (LU) ........................................ 502098

(51) Int. Cl.
*G06F 13/38*   (2006.01)
*G02B 6/43*    (2006.01)
*G06F 13/42*   (2006.01)

(52) U.S. Cl.
CPC ............. *G06F 13/385* (2013.01); *G02B 6/43* (2013.01); *G06F 13/4282* (2013.01)

(58) Field of Classification Search
CPC ....... G06F 13/385; G06F 13/4282; G06F 6/43
See application file for complete search history.

(56) References Cited

U.S. PATENT DOCUMENTS 5,068,847 A    11/1991  Stout
9,360,847 B2 *  6/2016  Feldmann ............ G05B 11/012
(Continued)

FOREIGN PATENT DOCUMENTS

DE    4106726 B4    9/1992
EP    1936456 A3    6/2008
(Continued)

OTHER PUBLICATIONS

Wikipedia, Star Coupler, https://de.wikipedia.org/wiki/sternkoppler, last edited Dec. 25, 2022, retrieved May 16, 2023, 2 pp. w/ translation.
(Continued)

*Primary Examiner* — Henry Tsai
*Assistant Examiner* — Christopher A Daley
(74) *Attorney, Agent, or Firm* — Kaplan Breyer Schwarz, LLP

(57) ABSTRACT

A primary communication apparatus includes: a bus interface which is adapted to connect the primary communication apparatus to a data bus; a memory device in which software is stored; and a control unit. The control unit is adapted, when executing the software, to cause the primary communication apparatus to: provide a communication telegram for a predetermined secondary communication apparatus; insert into the communication telegram a first address assigned to the predetermined secondary communication apparatus; copy the communication telegram n times, wherein n is greater than 1; insert into each of the copied communication telegrams a second address, wherein the second addresses are all different and each is assigned to a separate coupling module; and transmit each of the copied communication telegrams via the bus interface.

16 Claims, 1 Drawing Sheet

(56) References Cited

U.S. PATENT DOCUMENTS

| | | | | |
|---|---|---|---|---|
| 9,959,231 | B2* | 5/2018 | Pohle | G05B 19/042 |
| 10,649,932 | B2* | 5/2020 | Hesse | G05B 19/406 |
| 11,398,919 | B2* | 7/2022 | Janssen | H04L 12/40169 |
| 11,582,061 | B2* | 2/2023 | Mertens | H04L 12/40013 |
| 12,032,489 | B2* | 7/2024 | Kim | G06F 12/1009 |
| 2013/0080846 | A1* | 3/2013 | Premke | H04L 1/0011 |
| | | | | 714/704 |
| 2014/0226459 | A1* | 8/2014 | Edmiston | H04L 12/437 |
| | | | | 370/254 |
| 2018/0276174 | A1* | 9/2018 | Buesching | G06F 13/4265 |
| 2020/0341939 | A1* | 10/2020 | Hietala | G06F 13/362 |

FOREIGN PATENT DOCUMENTS

| | | | |
|---|---|---|---|
| EP | 3393061 | A1 | 10/2018 |
| WO | 2020/232494 | A1 | 11/2020 |

OTHER PUBLICATIONS

European Search Report issued in EP Patent Application No. 23173742.0 on Sep. 15, 2023 and English Translation thereof.
Office Action issued in Luxembourg Patent Application No. LU502098, Jan. 9, 2023, 17 pp. w/ translation.

* cited by examiner

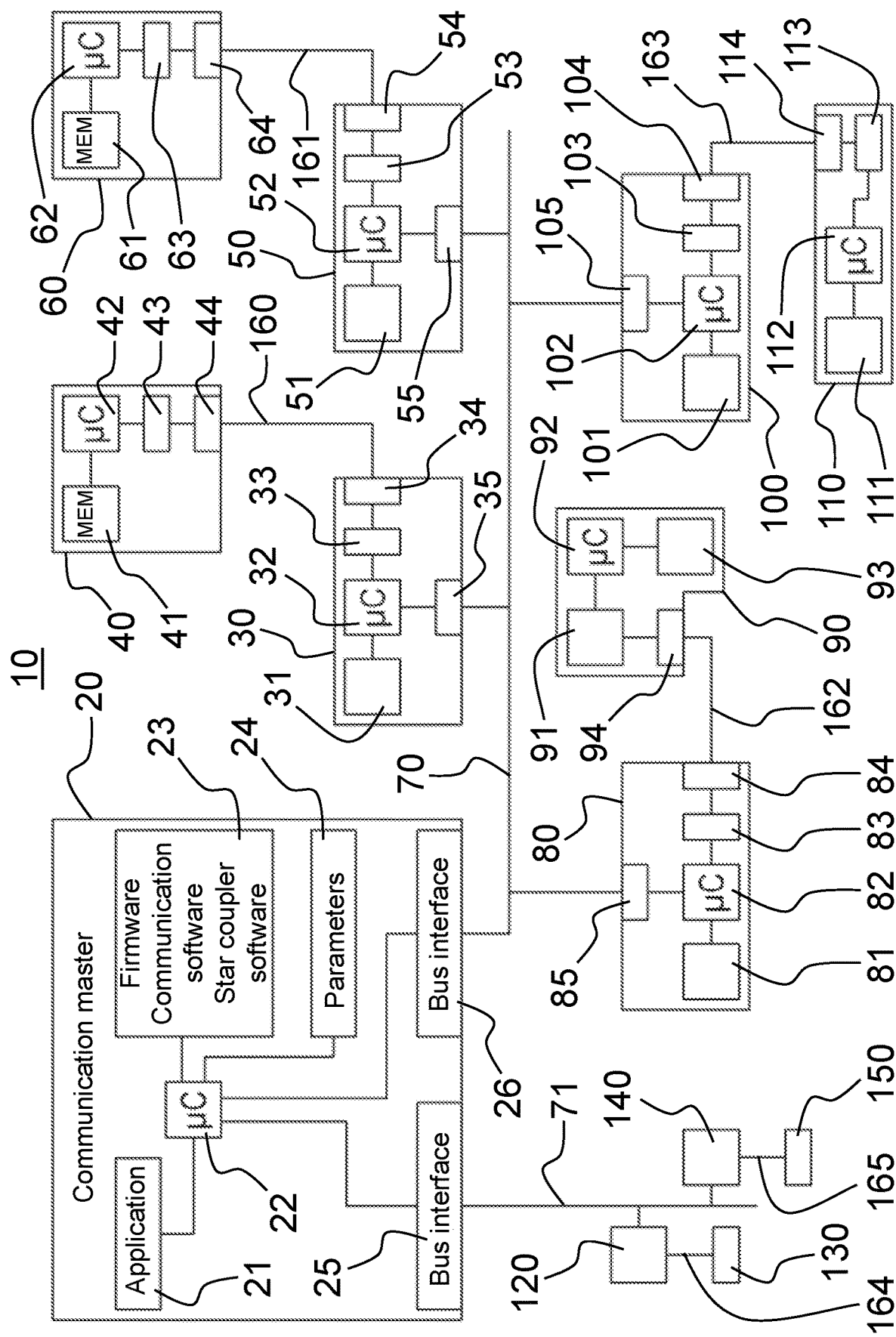

PRIMARY COMMUNICATION APPARATUS, COUPLING MODULE AND COMMUNICATION SYSTEM

RELATED APPLICATION

This application claims the priority benefit of Luxembourg Application No. LU502098, filed May 17, 2022, the entire disclosure of which is incorporated herein by reference.

FIELD

The invention relates to a primary communication apparatus, in particular a communication master, a coupling module for a secondary communication apparatus, in particular a communication slave, and a communication system comprising a primary communication apparatus, a plurality of coupling modules and a plurality of secondary communication apparatuses.

BACKGROUND

For the transmission of data between a central apparatus and subordinate apparatuses, a data bus in the form of a copper line can be used, to which the central apparatus and the subordinate apparatuses can be connected. The data transmission can, for example, be controlled by a communication protocol according to the IEC 60870-5-103 or IEC 60870-5-101 standard. In this case, the central apparatus, which can be provided as a communication master, transmits a telecommunication telegram to all subordinate apparatuses, wherein only the addressed subordinate apparatus can further process the received communication telegram. If a fiber optic network is used as the communication network, a point-to-point connection must be implemented from the central apparatus to each individual subordinate apparatus. An optical waveguide star coupler can be used for this purpose, which couples a light signal into several optical waveguides simultaneously.

Such optical waveguide star couplers are known and described, for example, on the Internet, at the URL https://de.wikipedia.org/wiki/sternkoppler. Such star couplers are designed as hardware-based network components and are used, for example, to couple a communication telegram in the form of light signals into several optical waveguides simultaneously. Such a star coupler has a fixed number of ports for connecting optical fibers.

A passive N×N star coupler of the reflection type is known from DE 41 06 726 B4, which is used in a communication network for motor vehicles.

SUMMARY

An object of the invention is to provide a primary communication apparatus, a coupling module, and a communication system that cost-effectively enable communication between a primary communication apparatus and a plurality of secondary communication apparatuses connected to the communication system via optical waveguides, without having to use a hardware-based optical waveguide star coupler with a fixed number of ports. According to an advantageous aspect, this allows a communication system to be scaled cost-effectively and quickly.

A core idea of the invention can be seen in providing a communication system, which enables communication between a primary communication apparatus and several secondary communication apparatuses, in particular according to a master/slave operation, wherein the secondary communication apparatuses are each connected to the communication system via at least one optical waveguide. Instead of using a hardware-based star coupler, a software-based star coupler functionality is implemented in the primary communication apparatus, which takes over the tasks of a star coupler designed as a hardware component.

The above technical problem is solved by the features of claim 1. Advantageous embodiments and further modifications are the subject of claims 2 to 6.

Accordingly, a primary communication apparatus is provided, which may comprise the following features:

A bus interface which is adapted to connect the primary communication apparatus to a data bus,
  a memory device in which software is stored, and
  a control unit which is adapted, when executing the software, to cause the primary communication apparatus
   to provide a communication telegram for a predetermined secondary communication apparatus,
   to insert into the communication telegram a first address assigned to the predetermined secondary communication apparatus,
   to copy the communication telegram n times, wherein n is greater than 1,
   to insert into each of the copied communication telegrams a second address, wherein the second addresses are all different and each is assigned to a separate coupling module, and
   to transmit each of the copied communication telegrams via the bus interface.

It should be noted that the first address can be a broadcast address or an address uniquely assigned to the predetermined secondary communication apparatus. Using a broadcast address, the primary communication apparatus can send a single communication telegram to all secondary communication apparatuses, for example, to synchronize the time.

According to an advantageous embodiment, the primary communication apparatus acts as a master communication apparatus and the secondary communication apparatuses act as slave communication apparatuses.

According to an advantageous embodiment, the software stored in the memory device comprises a first program that implements a communication protocol supporting a master/slave operation and a second program that implements a star coupler functionality. Master/slave operation means in particular a call mode in which the primary communication apparatus specifically requests secondary communication apparatuses to transmit data, for example current measured values, to the primary communication apparatus.

The second program executing a star coupler functionality, unlike the communication protocol, knows the implemented communication infrastructure. Therefore, when executed by the control unit, the second program causes the primary communication apparatus to copy the communication telegram n times, wherein n is greater than 1, to insert a second address into each of the copied communication telegrams, wherein the second addresses are all different and each is assigned to a separate coupling module, and to transmit each of the copied communication telegrams via the bus interface. The parameter n preferably corresponds to the number of secondary communication apparatuses with which the primary communication apparatus forms a communication group.

The first program can preferably implement a communication protocol for serial data transmission. Preferably, the communication protocol is, for example, a Modbus protocol, a communication protocol according to the IEC60870-5-103 standard or according to the IEC60870-5-101 standard. The bus interface can be provided as a serial bus interface.

Preferably, the primary communication apparatus acts as a control apparatus. In particular, it can be adapted for use in remote control or station control technology.

In order to increase the flexibility and scalability of the primary communication apparatus, a further bus interface may be provided, which is adapted to connect the primary communication apparatus to a further data bus. The control unit can preferably be adapted, when executing the software stored in the primary communication apparatus, to cause the primary communication apparatus to transmit each of the copied communication telegrams via the bus interface or the further bus interface. Preferably, an identifier of the bus interface or the further bus interface can be inserted into each copied communication telegram for this purpose.

To enable flexible data transmission that is preferably decoupled from the transmission speed, the control unit of the primary communication apparatus may be adapted, when executing the software, to cause the primary communication apparatus to segment at least some of the copied communication telegrams and to transmit the segments of each segmented communication telegram individually via the bus interface.

The above technical problem is further solved by the features of claim 7. Advantageous embodiments and further modifications are the subject of claims 8 to 11.

Accordingly, a coupling module is provided, which may have the following features: A bus interface adapted to connect the coupling module to a data bus, wherein a unique address is assigned to the coupling module, an electro-optical converter device comprising an optical transmitting and receiving device,
- a single optical waveguide connection device which is adapted to connect a single secondary communication apparatus by means of at least one optical waveguide
- a memory device in which software is stored, and
- a control and evaluation device which is adapted, when executing the software stored in the coupling module, to cause the coupling module to read out the second address from a communication telegram arriving at the bus interface, wherein the communication telegram comprises a first address assigned to a secondary communication apparatus and a second address which is assigned to a coupling module, and to supply the communication telegram via the electro-optical converter device to the single optical waveguide connection device only if the read-out second address matches the unique address assigned to the coupling module.

According to an advantageous embodiment, the electro-optical converter device may have a light-emitting device that can be used not only as a light transmitter, but also as a receiver photodiode in the receiving mode. In this case, the optical waveguide connection device has only one port for connecting a single optical waveguide that can be used in both transmitting and receiving modes. This is possible in particular if the coupling module is to operate in half-duplex mode.

If full-duplex communication operation is to be ensured, the electro-optical converter device has two separate electro-optical converters, one for optical transmit operation and one for optical receive operation. In this case, the single optical waveguide connection device has two separate ports to which one optical waveguide for transmit operation and one optical waveguide for receive operation can be connected.

According to an advantageous embodiment, the control and evaluation device of the coupling module can be adapted, when executing the software stored in the coupling module, to cause the coupling module to remove the second address from the communication telegram and to transmit only the correspondingly processed communication telegram via the single optical waveguide connection device.

The bus interface of the coupling module can be provided as a serial bus interface.

According to an advantageous embodiment, the control and evaluation device of the coupling module can further be adapted, when executing of the software stored in the coupling module, to cause the coupling module to transmit a communication telegram arriving at the single optical waveguide connection device, which comprises an address uniquely assigned to a secondary communication apparatus, by means of the electro-optical converter device via the bus interface.

According to an advantageous embodiment, the control and evaluation device of the coupling module can be adapted, when executing the software stored in the coupling module, to cause the coupling module to reassemble the segments of a segmented communication telegram arriving at the bus interface into the original communication telegram.

The above technical problem is also solved by the features of claim 12. Advantageous embodiments and further modifications are the subject of claims 13 to 16.

The communication system is particularly suitable for use in remote control or station control technology.

The communication system may have the following features:
- A data bus,
- a primary communication apparatus according to any one of claims 1 to 6 connected to the data bus,
- a plurality of first coupling modules according to any one of claims 7 to 11, each connected to the data bus, wherein each of the first coupling modules is assigned a unique address.

A first secondary communication apparatus is connected to the single optical waveguide connection device of each of the coupling modules via at least one optical waveguide, wherein each of the first secondary communication apparatuses is assigned a unique address, wherein n, i.e. the number of copy operations, is equal to the number of first coupling modules. It should be noted that n can be stored as an adjustable or programmable parameter in the primary communication apparatus.

Each of the first secondary communication apparatuses comprises a memory device in which software is stored, an optical waveguide connection device, an electro-optical converter device with an optical transmitting and receiving device, and a control and evaluation device. The control and evaluation device of each of the first secondary communication apparatuses is adapted, when executing the software stored in the first secondary communication apparatus, to cause the first secondary communication apparatus
- to read out the first address from a communication telegram received via the optical waveguide connection device, which comprises a first address, and to check it for correspondence with the unique address assigned to the respective first secondary communication apparatus, and
- in case of a correspondence, to generate a response telegram in dependence of the received communication telegram and to supply this via the electro-optical converter device to the optical waveguide connection device for transmission.

The data bus preferably is provided as a serial bus. The data bus can also be a peripheral bus, for example. In this case, the primary communication apparatus and the coupling modules can preferably be accommodated in a common housing.

According to an advantageous embodiment, the primary communication apparatus can be adapted to receive a response telegram from one of the first secondary communication apparatuses at its bus interface, wherein the control unit of the primary communication apparatus can be adapted, when executing the software stored in the primary communication apparatus, to evaluate and/or forward and/or process the received response telegram.

In order to increase the flexibility and possible applications of the communication system, a plurality of second coupling modules according to any one of claims 7 to 11 may be provided, each of which is connected to the data bus. Each of the second coupling modules is again assigned a unique address, wherein a second secondary communication apparatus is connected to the single optical waveguide connection device of each of the second coupling modules via at least one optical waveguide, wherein each of the second secondary communication apparatuses is assigned a unique address. The primary communication apparatus and the first coupling modules may be considered as a first communication group, whereas the primary communication apparatus and the second coupling modules may be considered as a second communication group. Preferably, the control unit of the primary communication apparatus is further adapted, when executing the software stored in the primary communication apparatus, to cause the primary communication apparatus to provide a second communication telegram for a predetermined second secondary communication apparatus, to insert into the second communication telegram a first address assigned to the predetermined second secondary communication apparatus, to copy the second communication telegram m times, wherein m is greater than 1 and equal to the number of second coupling modules, to insert a second address into each of the copied communication telegrams, wherein the second addresses are all different and each is assigned to one of the second coupling modules, and to transmit each of the copied communication telegrams via the bus interface.

To further increase flexibility and application possibilities, a further data bus may be provided to which the primary communication apparatus and a plurality of third coupling modules according to any one of claims 7 to 11 are connected. Each of the third coupling modules is assigned a unique address, wherein a third secondary communication apparatus is connected to the single optical waveguide connection device of each of the third coupling modules via at least one optical waveguide. A unique address is assigned to each of the third secondary communication apparatuses.

BRIEF DESCRIPTION OF THE DRAWING

The invention is explained in more detail below in connection with the single FIG. 1, which shows an exemplary communication system.

DETAILED DESCRIPTION

FIG. 1 shows an exemplary communication system 10, which can be used, for example, in remote control or station control technology.

The exemplary communication system preferably comprises a primary communication apparatus 20, which may be operated, for example, as a communication master. The primary communication apparatus 20 may function as a control apparatus, for example as a programmable logic controller.

The exemplary primary communication apparatus 20 comprises, among other things, a bus interface 26, which is adapted for connecting the primary communication apparatus 20 to a data bus 70. It should already be noted at this point that the data bus is preferably adapted for bit-serial data transmission. The data bus may also be a peripheral bus.

Several coupling modules can be connected to the data bus. According to the exemplary communication system 10, for example, four coupling modules 30, 50, 80 and 110 are connected to the data bus 70. For this purpose, the coupling modules 30, 50, 80 and 110 each have a bus interface 35, 55, 85 and 105, respectively. It should be mentioned here that the bus interfaces 26, 35, 55, 85 and 105 can be designed, for example, according to the Modbus communication protocol, according to a communication protocol according to the IEC60870-5-101 standard or according to the IEC60870-5-103 standard.

The primary communication apparatus 20, for example, may have another bus interface 25 adapted to connect the primary communication apparatus to another data bus 71. The bus interface 25 may also be designed, for example, in accordance with the Modbus communication protocol, in accordance with a communication protocol according to the IEC60870-5-101 standard or the IEC60870-5-103 standard. Further connection modules can be connected to the further data bus 71 in a similar manner as to the data bus 70, wherein two connection couplings 120 and 140 are shown according to the exemplary communication system.

The exemplary primary communication apparatus 20 further preferably comprises a memory device 23 that stores software for monitoring and controlling the primary communication apparatus 20. The memory device may comprise a plurality of separate memories. Further, a control unit 22 is arranged in the primary communication apparatus, which may be a microcontroller or microprocessor.

The control unit 22 is adapted, when executing the software stored in the memory device 23, to cause the primary communication apparatus 20 a) to generate or provide a communication telegram for a predetermined secondary communication apparatus, b) to insert into the communication telegram a first address assigned to the predetermined secondary communication apparatus, c) to copy the communication telegram n times, wherein n is greater than n, and d) to insert into each of the copied communication telegrams a second address, wherein the second addresses are all different and each is assigned to a separate coupling module, and e) to transmit each of the copied communication telegrams via the bus interface 26 or, if the primary communication apparatus 20 has the further bus interface 25, via the further bus interface 25.

Advantageously, the software comprises a first program that implements a communication protocol supporting a master/slave operation and a second program that implements a star coupler functionality. Preferably, the software also includes firmware or an operating system.

It should be noted here that preferably the control unit 22, when executing the first program, causes the primary communication apparatus 20 to execute steps a) and b). Advantageously, the control unit 22, when executing the second program, causes the primary communication apparatus 20 to execute steps c) to e).

The first program, when executed by the control unit 22, may cause the primary communication apparatus to control, for example, a serial data transmission, wherein the communication protocol may be, for example, a Modbus protocol, a communication protocol according to the IEC60870-5-101 standard, or according to the IEC60870-5-103 standard. The bus interface 26 and, if present, the bus interface 25, can respectively be provided as a serial bus interface.

In order to enable flexible data transmission, i.e. decoupled from the transmission speed, the control unit 22 can be adapted, when executing the software stored in the primary communication apparatus 20 and in particular when executing the first program, to cause the primary communication apparatus 20 to segment at least some of the copied communication telegrams and to transmit the segments of each segmented communication telegram individually via the bus interface 26 or, if present, via the bus interface 25. A further memory device 21 may be provided in the primary communication apparatus 20, in which at least one application program is stored, which comprises, for example, the function block of a communication master and/or instructions for controlling a specific application case.

As already explained above, each coupling module has a bus interface for connecting to the data bus 70 or the data bus 71.

Since the coupling modules can preferably be designed and operated identically or similarly, the exemplary design and an exemplary mode of operation of the coupling modules is explained below primarily with reference to the coupling module 30. The following explanations with regard to the coupling module 30 thus also apply to the coupling modules 50, 80, 100, 120 and 140.

The coupling module 30 comprises an electro-optical converter device 33 having an optical transmitting and receiving device. Depending on the implementation, the electro-optical converter device may have two separate electro-optical converters, namely one for transmitting light signals and one for receiving light signals. In this way, full-duplex data transmission is possible. In case a half-duplex communication mode is to be implemented, the electro-optical converter device 33 may comprise a light emitting device, for example an LED, which may act as a light emitter in the transmitting mode, and as a photodiode in the receiving mode.

Further, the coupling module 30 has a single optical waveguide connection device 34 connected to the electro-optical converter device 33, which has a single port for connecting a single optical waveguide 160 or two ports to each of which one optical waveguide for receiving and a second optical waveguide for transmitting optical signals can be connected, depending on whether a full-duplex operation or a half-duplex communication operation is implemented. In the present example, it is assumed for simplicity that the communication system 10 is to be operated in a half-duplex mode. Therefore, the electro-optical converter device 33 has a single light emitting component for transmitting and receiving light signals. It should be noted at this point that the functionality of electro-optical converter devices is known per se. In the present embodiment, in the transmitting mode, the electro-optical converter device 33 converts electrical signals representing a communication telegram into light signals, which are transmitted via the optical waveguide connection device 34, while in the receiving mode, it converts the light signals arriving at the optical waveguide connection device 34 into electrical signals, again representing a communication telegram, and supplies them to the bus interface 35.

A single secondary communication apparatus 40 may be connected to the single optical waveguide connection device 34 of the coupling module 30 by means of at least one optical waveguide 160. Further, the coupling module 30 may comprise a memory device 31 in which software is stored. Furthermore, the coupling module 30 preferably comprises a control and evaluation device 32, which is adapted, when executing the software stored in the memory device 31, to cause the coupling module 30 to read out the second address from an electrical communication telegram arriving at the bus interface 35, which comprises a first address assigned to a secondary communication apparatus and a second address assigned to a coupling module, and to supply the communication telegram to the single optical waveguide connection device 34 via the electro-optical converter device 33 only if the read-out second address matches the unique address assigned to the coupling module 30. It should be noted that the unique address of the coupling module 30 may also be stored in the memory device 31. Advantageously, the control and evaluation device 32 of the coupling module 30 is adapted, when executing the software stored in the memory device 31, to cause the coupling module 30 to remove the second address from the communication telegram and to supply the communication telegram thus processed to the electro-optical converter device 33. It should also be noted that the control and evaluation device 32 may be a microcontroller or a microprocessor.

The control and evaluation device 32 can further be adapted, when executing the software stored in the memory device 31, to cause the coupling module 30 to supply a light signal arriving at the single optical waveguide connection device 34, which represents a communication telegram comprising an address uniquely assigned to the secondary communication apparatus 40, via the electro-optical converter device 33 as an electrical signal to the bus interface 35 for transmission via the data bus 70. Furthermore, the control and evaluation device 32 of the coupling module 30 can be adapted, when executing the software stored in the memory device 31, to cause the coupling module 30 to reassemble the segments of a segmented communication telegram arriving at the bus interface 35 into the original communication telegram.

The other coupling modules 50, 80, 100, 120 and 140 also have a control and evaluation unit 52, 82 and 102, respectively, a memory device 51, 81 and 101, respectively, for storing software, an electro-optical converter device 53, 83 and 103, respectively, and a single optical waveguide connection device 54, 84 and 104, respectively. For simplicity, the corresponding components in the connection couplings 120 and 140 are not shown.

Merely by way of example, it may be assumed that the exemplary communication system 10, as already mentioned, supports half-duplex communication operation. This means that all electro-optical converter devices, i.e. also the converter devices 53, 83 and 103 each have a single light-emitting component that functions, for example, as a light-emitting diode in transmit mode and as a photodiode in receive mode. Accordingly, each optical waveguide connection device, and thus also the optical waveguide connection devices 54, 84 and 104, respectively, and the corresponding optical waveguide connection devices of the coupling modules 120 and 140 each have only one connection for connecting an optical waveguide 161, 162, 163, 164 and 165, respectively, which is used for both transmitting and receiving operation. As FIG. 1 further shows, a secondary communication apparatus 60 is connected to the single optical waveguide connection device 54 of the coupling module 50 via the optical waveguide 161, a secondary communication apparatus 90 is connected to the single optical waveguide connection device 84 of the coupling module 80 via the optical waveguide 162, a secondary communication apparatus 110 is connected to the single optical waveguide connection device 104 via the optical waveguide 163, a secondary communication apparatus 130 is connected to the single optical waveguide connection device of the coupling module 120 via the optical waveguide 164, and a secondary communication apparatus 150 is connected to the single optical waveguide connection device of the coupling module 140 via the optical waveguide 165.

Similar to the secondary communication apparatus 40, the secondary communication apparatuses 60, 90, and 110 may each comprise a memory device 61, 91, and 111, respectively, a control unit 62, 92, and 112, respectively, an electro-optical converter device 63, 93, and 113, respectively, and an optical waveguide connection device 64, 94, and 114, respectively. The secondary communication apparatuses 130 and 150 may preferably have the same components (not shown).

Each of the secondary communication apparatuses 40, 60, 90, 110, 130 and 150 is preferably assigned a unique address and, depending on the implementation, for example a broadcast address, which may be stored in the respective memory device.

The control and evaluation device 42 of the secondary communication apparatus 40 can be adapted, when executing the software stored in the memory device 41, to cause the secondary communication apparatus 40 to read out the first address from a communication telegram received via the optical waveguide connection device 44, which telegram comprises a first address, and to check it for correspondence with the unique address assigned to the secondary communication apparatus 40 and, in case of correspondence, to generate a response telegram in dependence of the received communication telegram and to supply this via the electro-optical converter device 43 to the optical waveguide connection device 44 for transmission. It is understood that the light signals received at the optical waveguide connection device 44, which represent the communication telegram, are first converted into an electrical signal by means of the electro-optical converter device 43, which is then supplied to the control and evaluation device 42 for further processing. It should be noted that the design and operation of the other secondary communication apparatuses may be identical or at least similar to the design and operation of the secondary communication apparatus 40. Therefore, the explanations regarding the secondary communication apparatus 40 also apply to the secondary communication apparatuses 60, 90, 110, 130 and 150.

The operation of the exemplary communication system 10 is explained below with reference to some exemplary scenarios.

1. Exemplary Scenario

Firstly, it is assumed that the optional bus interface 25 of the primary communication apparatus 20 is disabled or not present at all. Further, according to the first scenario, a communication infrastructure is assumed, according to which the primary communication apparatus 20, the coupling modules 30, 50, 80, and 100, and the secondary communication apparatuses 40, 60, 90, and 110 form a communication group. Further, it is assumed for simplicity that the secondary communication apparatuses 40, 60, 90, and 110 are temperature sensors and that according to an exemplary use case, the primary communication apparatus 20 acting as a communication master is to request temperature values from the secondary communication apparatuses 40, 60, 90, and 110.

Now, the primary communication apparatus 20 starts, for example, the application program stored in the memory device 21 and, under execution of the first program stored in the memory device 23, generates a communication telegram for a predetermined secondary communication apparatus, in this case initially for the secondary communication apparatus 40. When executing the first program, the control unit 22 causes the primary communication apparatus 20 to insert the address uniquely assigned to the secondary communication apparatus 40 as the first address into the communication telegram. Furthermore, a command is inserted into the communication telegram requesting a secondary communication apparatus to transmit its current temperature data. The primary communication apparatus 20 or the second program is aware of the configuration of the communication infrastructure of the communication system 10, i.e. it knows the unique addresses of the coupling modules 30, 50, 80 and 100 and the parameter n corresponding to the number of coupling modules of the communication group. In the present case, the parameter n is 4. Consequently, the control unit 22, under execution preferably of the second program implementing the star coupler functionality, causes the primary communication apparatus 20 to copy the generated communication telegram with the address of the secondary communication apparatus 40 four times and to insert a second address into each of the four copied communication telegrams, wherein the second addresses are all different and each is assigned to one of the coupling modules 30, 50, 80 and 100. In other words: The unique address of the coupling module 30 is inserted into the first copied communication telegram, the unique address of the coupling module 50 is inserted into the second copied communication telegram, the unique address of the coupling module 80 is inserted into the third copied communication telegram, and the unique address of the coupling module 100 is inserted into the fourth copied communication telegram. Further, preferably under execution of the second program, the control unit 22 causes the primary communication apparatus 20 to transmit all four copied communication telegrams sequentially via the bus interface 26 and via the bus 70. The four copied communication telegrams transmitted as electrical signals via the bus 70 are received at the bus interfaces 35, 55, 85 and 105 of the coupling modules 30, 50, 80 and 100, respectively. The control and evaluation device of each of the coupling modules 30, 50, 80 and 100 causes the respective coupling module, under execution of the stored software, to read out from each of the four copied communication telegrams arriving at the respective bus interface the second address representing a unique address of a coupling module and to compare it with the unique address stored in the respective coupling module. Only the copied communication telegram is then fed via the electro-optical converter device to the single optical waveguide connection device whose read-out second address matches the unique address assigned to the respective coupling module.

This means for the present case that only the control and evaluation device 32 causes the coupling module 30 to supply the first copied communication telegram, which comprises the unique address of the coupling module 30, via the electro-optical converter device 33 to the single optical waveguide connection device 34 and to transmit it as a light signal via the optical waveguide 160 to the secondary communication apparatus 40, wherein it should also be noted that the second address is preferably removed from the first copied communication telegram before retransmission, only the control and evaluation device 52 causes the coupling module 50 to supply the second copied communication telegram, which comprises the unique address of the coupling module 50, via the electro-optical converter device 53 to the single optical waveguide connection device 54 and to transmit it as a light signal via the optical waveguide 161 to the secondary communication apparatus 60, wherein it should also be noted that the second address is preferably removed from the second copied communication telegram before retransmission, only the control and evaluation device 82 causes the coupling module 80 to supply the third copied communication telegram, which comprises the unique address of the coupling module 80, via the electro-optical converter device 83 to the single optical waveguide connection device 84 and to transmit it as a light signal via the optical waveguide 162 to the secondary communication apparatus 90, wherein it should also be noted that the second address is preferably removed from the third copied communication telegram before retransmission, and only the control and evaluation device 102 causes the coupling module 100 to supply the fourth copied communication telegram, which comprises the unique address of the coupling module 100, via the electro-optical converter device 103 to the single optical waveguide connection device 104 and to transmit it as a light signal via the optical waveguide 163 to the secondary communication apparatus 110, wherein it should also be noted that the second address is preferably removed from the fourth copied communication telegram before retransmission.

In this way, the communication telegram generated by the primary communication apparatus 20 and intended for the secondary communication apparatus 40 is transmitted in copied form to all secondary communication apparatuses 40, 60, 90 and 110 via the respective optical waveguides. However, the received communication telegram is accepted only by the secondary communication apparatus 40 and discarded by all other secondary communication apparatuses. This is because the unique address of the secondary communication apparatus 40 is included as the first address in each received communication telegram. In particular, for this purpose, the first copied communication telegram received as a light signal is firstly converted into a corresponding electrical communication telegram via the electro-optical converter device 43. The control and evaluation device 42, under execution of the software stored in the memory device 41, causes the secondary communication apparatus 40 to read out the first address from the received communication telegram and to compare it for correspondence with the unique address of the secondary communication apparatus stored in the memory device 41. Only the control and evaluation device 42 determines a match between the first address comprised in the communication telegram and the address uniquely assigned to the secondary communication apparatus 40. Accordingly, only the control and evaluation device 42 causes the secondary communication apparatus 40, in response to the command comprised in the communication telegram, to generate a response telegram in which the current temperature and the unique address of the secondary communication apparatus 40 are stored, and to supply this response telegram to the optical waveguide connection device 44 as a light signal via the electro-optical converter device 43 and to transmit it to the coupling module 30 via the optical waveguide 160.

The coupling module 30 receives the optical response telegram at the optical waveguide connection device 34, which is converted into a corresponding electrical response telegram by means of the electro-optical converter device 33 and transmitted to the primary communication apparatus 20 via the bus interface 35 and the data bus 70. The control unit 22 of the primary communication apparatus 20 is adapted, under execution of the software stored in the primary communication apparatus 20, which is preferably the second program, to process the received response telegram, for example, and to transfer the current temperature values comprised therein to the application program stored in the memory device 21 for further use.

In order to be able to query the current temperature values of the other secondary communication apparatuses 60, 90 and 110, for example, three further communication telegrams are generated by the primary communication apparatus 20 in the manner described above, into each of which a different one of the unique addresses of the secondary communication apparatuses 60, 90 and 110 is inserted. Each of the three communication telegrams is then again copied four times and transmitted in succession to the coupling modules 30, 50, 80 and 100 via the bus interface 26 and the bus 70. Subsequently, the procedure previously explained in detail is repeated for each of the copied communication telegrams. At the end of the exemplary communication cycle, the primary communication apparatus 20 has received the current temperature values of each of the secondary communication apparatuses 40, 60, 90 and 110.

2. Exemplary Scenario

Firstly, it is again assumed that the optional bus interface 25 of the primary communication apparatus 20 is disabled or not present at all. Further, according to the second scenario, a communication infrastructure is assumed, according to which the primary communication apparatus 20, the coupling modules 30, 50 and the secondary communication apparatuses 40, 60 form a first communication group, while the primary communication apparatus 20, the coupling modules 80, 100 and the secondary communication apparatuses 90, 110 form a second communication group. Further, it is assumed for simplicity that the secondary communication apparatuses 40, 60, 90 and 110 are temperature sensors and that according to an exemplary use case, the primary communication apparatus 20 acting as a communication master is to request temperature values from the secondary communication apparatuses 40, 60, 90 and 110. It should also be noted that the primary communication apparatus 20 or the second program is aware of the configuration of the communication infrastructure of the communication system 10, i.e. it is aware of the first communication group and thus the unique addresses of the coupling modules 30 and 50, and the parameter n corresponding to the number of coupling modules of the first communication group, and of the second communication group and thus the unique addresses of the coupling modules 80 and 100, and the parameter m corresponding to the number of coupling modules of the second communication group. The parameters n and m are each 2 in the present case.

Now the primary communication apparatus 20 starts the communication of the first communication group. For this purpose, the primary communication apparatus 20 accesses, for example, the application program stored in the memory device 21 and, under execution of the first program stored in the memory device 23, generates a communication telegram for a predetermined secondary communication apparatus, in this case initially for the secondary communication apparatus 40 of the first communication group. When executing the first program, the control unit 22 causes the primary communication apparatus 20 to insert into the communication telegram, as the first address, the address uniquely assigned to the secondary communication apparatus 40. Further, a command requesting a secondary communication apparatus to transmit its current temperature data is inserted into the communication telegram.

Now, under execution preferably of the second program implementing the star coupler functionality, the control unit 22 causes the primary communication apparatus 20 to copy the generated communication telegram with the address of the secondary communication apparatus 40 2 times and to insert a second address into each of the two copied communication telegrams, wherein the second addresses are all different and are respectively assigned to one of the coupling modules 30 and 50. In other words: The unique address of the coupling module 30 is inserted into the first copied communication telegram, and the unique address of the coupling module 50 is inserted into the second copied communication telegram. Furthermore, the control unit 22, preferably under execution of the second program, causes the primary communication apparatus 20 to transmit the two copied communication telegrams sequentially via the bus interface 26 and via the bus 70. The two copied communication telegrams respectively transmitted as electrical signals via the bus 70 are respectively received at the bus interfaces 35 and 55 of the coupling modules 30 and 50. The control and evaluation device of each of the coupling modules 30 and 50 causes the respective coupling module, under execution of the stored software, to read out from each of the two copied communication telegrams arriving at a respective bus interface the second address representing a unique address of a coupling module and to compare it with the unique address stored in the respective coupling module. Only the copied communication telegram is then fed via the electro-optical converter device to the single optical waveguide connection device whose read-out second address matches the unique address assigned to the respective coupling module.

This means for the present case that
  only the control and evaluation device 32 causes the coupling module 30 to supply the first copied communication telegram, which comprises the unique address of the coupling module 30, via the electro-optical converter device 33 to the single optical waveguide connection device 34 and to transmit it as a light signal via the optical waveguide 160 to the secondary communication apparatus 40, wherein it should also be noted that the second address is preferably removed from the first copied communication telegram before retransmission, and
  only the control and evaluation device 52 causes the coupling module 50 to supply the second copied communication telegram, which comprises the unique address of the coupling module 50, via the electro-optical converter device 53 to the single optical waveguide connection device 54 and to transmit it as a light signal via the optical waveguide 161 to the secondary communication apparatus 60, wherein it should also be noted that the second address is preferably removed from the second copied communication telegram before retransmission.

In this way, the communication telegram generated by the primary communication apparatus 20 and intended for the secondary communication apparatus 40 is transmitted in copied form to the two secondary communication apparatuses 40 and 60 via the respective optical waveguides. However, the received communication telegram is accepted only by the secondary communication apparatus 40 and discarded by the secondary communication apparatus 60. This is because the unique address of the secondary communication apparatus 40 is comprised as the first address in each received communication telegram. In particular, for this purpose, the first copied communication telegram received as a light signal is firstly converted into a corresponding electrical communication telegram via the electro-optical converter device 43. The control and evaluation device 42, under execution of the software stored in the memory device 41, causes the secondary communication apparatus 40 to read out the first address from the received communication telegram and to compare it for correspondence with the unique address of the secondary communication apparatus stored in the memory device 41. Only the control and evaluation device 42 determines a match between the first address comprised in the communication telegram and the address uniquely assigned to the secondary communication apparatus 40. Accordingly, only the control and evaluation device 42 causes the secondary communication apparatus 40, in response to the command comprised in the communication telegram, to generate a response telegram in which the current temperature and the unique address of the secondary communication apparatus 40 are stored, and to supply this response telegram to the optical waveguide connection device 44 as a light signal via the electro-optical converter device 43 and to transmit it to the coupling module 30 via the optical waveguide 160.

The coupling module 30 receives the optical response telegram at the optical waveguide connection device 34, which is converted into a corresponding electrical response telegram by means of the electro-optical converter device 33 and transmitted to the primary communication apparatus 20 via the bus interface 35 and the data bus 70. The control unit 22 of the primary communication apparatus 20 is adapted, under execution of the software stored in the primary communication apparatus 20, which is preferably the second program, to process the received response telegram, for example, and to transfer the current temperature values comprised therein to the application program stored in the memory device 21 for further use.

In order to be able to query the current temperature value of the secondary communication apparatus 60, for example, a further communication telegram is generated by the primary communication apparatus 20 in the manner described above, into which the unique address of the secondary communication apparatus 60 is inserted. The further communication telegram is then again copied twice. The copied communication telegrams are then transmitted in sequence to the coupling modules 30 and 50 via the bus interface 26 and the bus 70. At the end of the exemplary communication cycle, the primary communication apparatus 20 has the current temperature values of the two secondary communication apparatuses 40 and 60 of the first communication group.

Now, the primary communication apparatus 20 starts the communication of the second communication group to obtain the current temperature values of the two secondary communication apparatuses 90 and 110 of the second communication group. Since this communication is substantially the same as the communication of the first communication group, in order to avoid repetition, reference is made to the above detailed description of the operation of the communication system 10 with respect to the first communication group.

3. Exemplary Scenario

A third exemplary scenario is described below, according to which the bus interface 25 is also present or activated. It is assumed now that the primary communication apparatus 20, the coupling modules 30, 50, 80 and 100 and the secondary communication apparatuses 40, 60, 90 and 110 form a first communication group, while the primary communication apparatus 20, the coupling modules 120 and 140 connected to the second data bus 71 and the secondary communication apparatuses 130 and 150 form a second communication group. For example, the two secondary communication apparatuses 130 and 150 are also temperature sensors.

Accordingly, the primary communication apparatus 20 respectively the second program is configured and parameterized in such a way that a) the unique addresses of the coupling modules 30, 50, 80 and 100 and the unique addresses of the secondary communication apparatuses 40, 60, 90 and 110 are assigned to the first communication group, wherein the parameter n, which corresponds to the number of coupling modules of the first communication group, is set to four, and that b) the unique addresses of the coupling modules 120 and 140 and the unique addresses of the secondary communication apparatuses 130 and 150 are assigned to the second communication group, wherein the parameter m, which corresponds to the number of coupling modules of the second communication group, is set to 2.

Furthermore, the primary communication apparatus 20 is configured or programmed in such a way that all communication telegrams or copied communication telegrams, which comprise the unique address of the coupling module 120 or of the coupling module 140 are transmitted via the bus interface 25 and the data bus 71, while all communication telegrams or copied communication telegrams, which comprise the unique address of the coupling modules 30, 50, 80 or 100 are transmitted via the bus interface 26 and the data bus 70. This can be achieved, for example, by assigning a unique identifier to each of the two bus interfaces 25, 26, which is inserted into the respective copied communication telegrams, for example by the second program.

The operation of the communication system 10 with respect to the first communication group is substantially the same as that of the first scenario, except that the primary communication apparatus 20 is further adapted to transmit all copied communication telegrams, which comprise the unique address of one of the coupling modules 30, 50, 80, and 100 via the bus interface 26, and to assign all response telegrams, which comprise the unique address of one of the secondary communication apparatuses 40, 60, 90, 110, to the first communication group. Therefore, to avoid repetition, reference is made to the description of scenario 1. As a result, at the end of the communication cycle, the primary communication apparatus 20 will have received the current temperature values from the secondary communication apparatuses 40, 60, 90 and 110.

The operation of the communication system 10 with respect to the second communication group is substantially the same as that described in the second scenario with respect to the first or second communication group, except that the primary communication apparatus 20 is further adapted to transmit all copied communication telegrams, which comprise the unique address of one of the two coupling modules 120 and 140, via the bus interface 25, and to assign all response telegrams, which comprise the unique address of one of the two secondary communication apparatuses 130 and 150 to the second communication group. Therefore, to avoid repetition, reference is made to the description of scenario 2. As a result, at the end of the communication cycle, the primary communication apparatus 20 will have received the current temperature values from the secondary communication apparatuses 130 and 150.

It should also be noted that the second program, which implements the star coupler functionality, can be implemented as part of a firmware, which can also be stored in the memory device 23, or as a separate application program, which can be stored in the memory device 21, for example.

The invention claimed is:

1. A primary communication apparatus comprising:
   a bus interface which is adapted to connect the primary communication apparatus to a data bus,
   a memory device in which software is stored, and
   a control unit which is adapted, when executing the software, to cause the primary communication apparatus to:
      provide a communication telegram for a predetermined secondary communication apparatus,
      insert into the communication telegram a first address assigned to the predetermined secondary communication apparatus,
      copy the communication telegram n times, wherein n is greater than 1,
      insert into each of the copied communication telegrams a second address, wherein the second addresses are all different and each is assigned to a separate coupling module, and
      transmit each of the copied communication telegrams via the bus interface.

2. The primary communication apparatus of claim 1, wherein the software comprises a first program that implements a communication protocol supporting a master/slave operation and a second program that implements a star coupler functionality.

3. The primary communication apparatus of claim 2, wherein the first program implements a communication protocol for serial data transmission, and wherein the bus interface is provided as a serial bus interface.

4. The primary communication apparatus of claim 1, wherein the primary communication apparatus is a control apparatus for use in remote control or station control technology.

5. The primary communication apparatus of claim 1, further comprising:
   a further bus interface, which is adapted to connect the primary communication apparatus to a further data bus,
   wherein the control unit is adapted, when executing the software, to cause the primary communication apparatus to transmit each of the copied communication telegrams via the bus interface or the further bus interface.

6. The primary communication apparatus of claim 1, wherein the control unit is adapted, when executing the software, to cause the primary communication apparatus to segment at least some of the copied communication telegrams and to transmit the segments of each segmented communication telegram individually via the bus interface.

7. A coupling module comprising:
a bus interface adapted to connect the coupling module to a data bus, wherein a unique address is assigned to the coupling module,
an electro-optical converter device comprising an optical transmitting and receiving device,
a single optical waveguide connection device which is adapted to connect a single secondary communication apparatus by means of at least one optical waveguide,
a memory device in which software is stored, and
a control and evaluation device which is adapted, when executing the software, to cause the coupling module to read out the second address from a communication telegram arriving at the bus interface, wherein the communication telegram comprises a first address assigned to a secondary communication apparatus and a second address assigned to a coupling module, and to supply the communication telegram via the electro-optical converter device to the single optical waveguide connection device only if the read-out second address matches the unique address assigned to the coupling module.

8. The coupling module according to claim 7, wherein the control and evaluation device is adapted, when executing the software, to cause the coupling module to remove the second address from the communication telegram.

9. The coupling module according to claim 7, wherein the bus interface is provided as a serial bus interface.

10. The coupling module according to claim 7, wherein the control and evaluation device is further adapted, when executing the software, to cause the coupling module to transmit a communication telegram arriving at the single optical waveguide connection device, which comprises an address uniquely assigned to a secondary communication apparatus, by means of the electro-optical converter device via the bus interface.

11. The coupling module according to claim 7, wherein the control and evaluation device is adapted, when executing the software, to cause the coupling module to reassemble the segments of a segmented communication telegram arriving at the bus interface into the original communication telegram.

12. A communication system comprising:
a data bus,
a primary communication apparatus connected to the data bus, the primary communication apparatus comprising:
a bus interface which is adapted to connect the primary communication apparatus to the data bus,
a memory device in which software is stored, and
a control unit which is adapted, when executing the software, to cause the primary communication apparatus to:
provide a communication telegram for a predetermined secondary communication apparatus,
insert into the communication telegram a first address assigned to the predetermined secondary communication apparatus,
copy the communication telegram n times, wherein n is greater than 1,
insert into each of the copied communication telegrams a second address, wherein the second addresses are all different and each is assigned to a separate coupling module, and
transmit each of the copied communication telegrams via the bus interface,
a first plurality of coupling modules, each of the coupling modules comprising:
a bus interface adapted to connect the coupling module to a data bus, wherein a unique address is assigned to the coupling module,
an electro-optical converter device comprising an optical transmitting and receiving device,
a single optical waveguide connection device which is adapted to connect a single secondary communication apparatus by means of at least one optical waveguide, a memory device in which software is stored, and
a control and evaluation device which is adapted, when executing the software, to cause the coupling module to read out the second address from a communication telegram arriving at the bus interface, wherein the communication telegram comprises a first address assigned to a secondary communication apparatus and a second address assigned to a coupling module, and to supply the communication telegram via the electro-optical converter device to the single optical waveguide connection device only if the read-out second address matches the unique address assigned to the coupling module, wherein the first plurality of the coupling modules are each connected to the data bus, wherein each of the first plurality of the coupling modules is assigned a unique address, wherein a first secondary communication apparatus is connected to the single optical waveguide connection device of each of the first plurality of the coupling modules via at least one optical waveguide,
wherein each of the first secondary communication apparatuses is assigned a unique address, wherein n is equal to the number of the first plurality the coupling modules,
wherein each of the first secondary communication apparatuses comprises a memory device, in which software is stored, an optical waveguide connection device, an electro-optical converter device having an optical transmitting and receiving device, and a control and evaluation device which is adapted, when executing the software, to cause the respective first secondary communication apparatus to:
read out the first address from a communication telegram received via the optical waveguide connection device, which comprises a first address, and check it for correspondence with the unique address assigned to the respective first secondary communication apparatus, and
in case of correspondence, generate a response telegram in dependence of the received communication telegram and to supply this via the electro-optical converter device to the optical waveguide connection device for transmission.

13. The communication system according to claim 12, wherein the data bus is a serial bus.

14. The communication system according to claim 12, wherein the primary communication apparatus is adapted to receive, at its bus interface, a response telegram from one of the first secondary communication apparatuses, and wherein the control unit of the primary communication apparatus is adapted, when executing the software stored in the primary communication apparatus, to evaluate and/or forward the received response telegram.

15. The communication system of claim 12, further comprising:
   a second plurality of the coupling modules, the second plurality of the coupling modules each connected to the data bus, wherein each of the second plurality of the coupling modules is assigned a unique address, wherein
   a second secondary communication apparatus is connected to the single optical waveguide connection device of each of the second plurality of the coupling modules via at least one optical waveguide, wherein each of the second secondary communication apparatuses is assigned a unique address, wherein the primary communication apparatus and the first plurality of the coupling modules form a first communication group and the primary communication apparatus and the second plurality of the coupling modules form a second communication group, wherein the control unit of the primary communication apparatus is further adapted, when executing the software, to cause the primary communication apparatus to:
   provide a second communication telegram for a predetermined second secondary communication apparatus,
   insert into the second communication telegram a first address assigned to the predetermined second secondary communication apparatus,
   copy the second communication telegram m times, wherein m is greater than 1 and equal to the number of the coupling modules of the second plurality of the coupling modules,
   insert into each of the copied communication telegrams a second address, wherein the second addresses are all different and each is assigned to one of the coupling modules of the second plurality the coupling modules, and
   transmit each of the copied communication telegrams via the bus interface.

16. The communication system according to claim 12 further comprising:
   a further bus interface, which is adapted to connect the primary communication apparatus to a further data bus,
   wherein the control unit is adapted, when executing the software, to cause the primary communication apparatus to transmit each of the copied communication telegrams via the bus interface or the further bus interface, and
   a further data bus to which the primary communication apparatus and a third plurality of the coupling modules are connected,
   wherein each of the third plurality of the coupling modules is assigned a unique address,
   wherein a third secondary communication apparatus is connected to the single optical waveguide connection device of each of the coupling modules of the third plurality of the coupling modules via at least one optical waveguide, and
   wherein a unique address is assigned to each of the third secondary communication apparatuses.

* * * * *